May 26, 1970     W. MÜLLER ET AL     3,514,205
ANCILLARY DEVICE FOR THE DETERMINATION OF THE
INSTANTANEOUS CAMERA CONSTANT
Filed Jan. 19, 1968     2 Sheets-Sheet 1

INVENTOR
Wilfried Müller
BY Klaus Bangolin
ATTORNEY

May 26, 1970  W. MÜLLER ET AL  3,514,205
ANCILLARY DEVICE FOR THE DETERMINATION OF THE
INSTANTANEOUS CAMERA CONSTANT
Filed Jan. 19, 1968                       2 Sheets-Sheet 2

INVENTOR
Wilfried Müller
BY Klaus Champlin
ATTORNEY

United States Patent Office 3,514,205
Patented May 26, 1970

3,514,205
ANCILLARY DEVICE FOR THE DETERMINATION OF THE INSTANTANEOUS CAMERA CONSTANT
Wilfried Müller and Klaus Szangolies, Jena, Germany, assignors to VEB Carl Zeiss Jena, Jena, Germany
Filed Jan. 19, 1968, Ser. No. 699,990
Int. Cl. G03b 27/68
U.S. Cl. 355—52       4 Claims

ABSTRACT OF THE DISCLOSURE

The ancillary device is used for determining the instantaneous camera constant, essential in the process of rectifying inclined photograms. The device is attachable to a known plotter or to a known differential rectifier, or is a self-contained unit between both. A stop plate rotatable in two or three dimensions cooperates with a feeler which is of variable length and whose inclination to a base may be changeable. On this base, the stop plate and the feeler are displaceable relatively to each other in planes which include the same angle as did the photogram and a horizontal plane at the moment of exposure.

---

Figure 1:
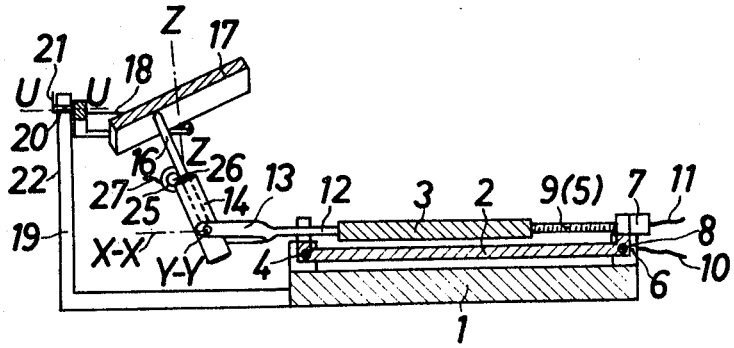

This invention relates to ancillary devices for the determination of the instantaneous camera constant of obliquely taken aerial photographs to be rectified differentially, which can be coupled to a photogrammetric plotter on the one hand and to a differential rectifier on the other and which are provided with means for finding the instantaneous camera constant as a function of the respective image points adjusted subsequently to each other in the plotter, said means transmitting these points to a control mechanism for changing the projection distance in said differential rectifier.

The instantaneous camera constant is the vertical distance of an image point in a photogram from a horizontal plane containing the respective center of projection or from an equivalent plane. In a known plotter, each photogram has coordinated to it two double levers which respectively embody the projection ray in two projection planes and cooperate with a system of ancillary levers and guides for finding, among other things, the instantaneous camera constant. The fact that this system of ancillary levers and guides, which is likewise divided for operation in two projection planes, can be used only in special cases, and that the result in the one projection plane is to be transmitted to the means for forming the result in the other, renders the plotter rather expensive in point of material and considerably complicates its setup.

The present invention aims at obviating these disadvantages by providing that the means for finding the instantaneous camera constant are less complex and less bulky and can be attached to any photogrammetric plotter for stereo-pairs.

To this end the invention consists in an ancillary device for the determination of the instantaneous camera constant, including a stop which is substantially at right angles to and cooperates with a feeler body of variable length displaceable in a plane at an angle to the stop, this angle corresponding to the inclination of a photogram placed in the plotter, and that the feeler body is kinematically connected with the plotter on the one hand and the differential rectifier on the other. The stop may be a plate or a slide guide and may be rotatable about two axes at right angles to each other or about a point. The means for finding the instantaneous camera constant may be separately located in two projection planes, the image inclination $\nu$ being divided into its components $\varphi$ and $\omega$, and one stop and one feeler body being associated with each component. The result of the instantaneous camera constant in the one component will not however enter into the result of the instantaneous camera constant in the other. The ancillary device of the invention may be attached to the plotter or to the differential rectifier or may be a self-contained unit coupled to both. Advantageously, the feeler body is rigidly connected with one of the photogram carriers of the plotter. If the photographs to be photogrammetrically plotted have been taken at angles of inclination greater than 5g, it is advisable to mount the feeler body for universal rotation.

Figure 2:
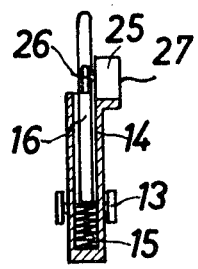
Figure 3:
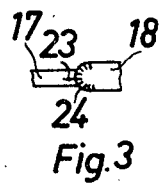
Figure 4:
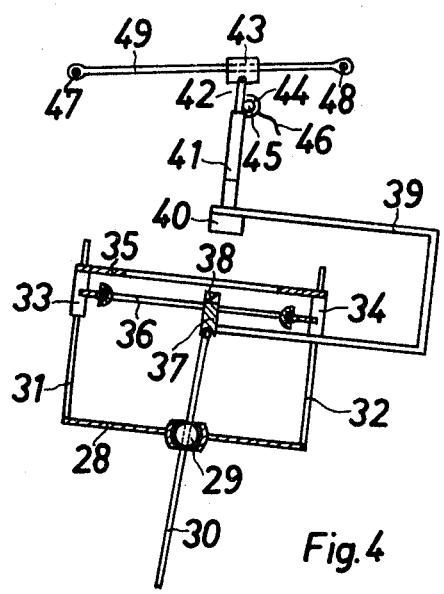
Figure 5:
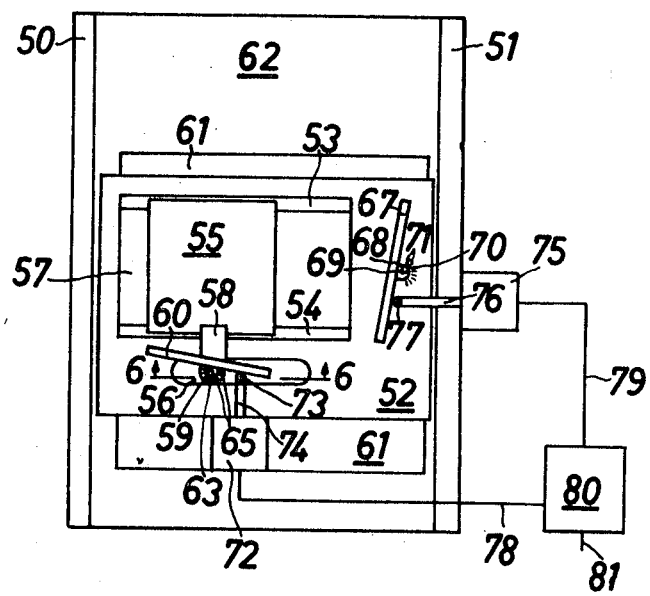
Figure 6:
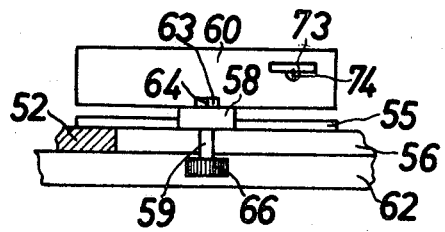

In order that the invention may be more readily understood, reference is made to the accompanying drawings, which illustrate diagrammatically and by way of example three embodiments thereof, and in which:

FIG. 1 is a sectional elevation of the first embodiment;
FIGS. 2 and 3 show details of FIG. 1;
FIG. 4 is a sectional elevation of the second embodiment, in rigid connection with a plotting apparatus;
FIG. 5 is a plan view of the third embodiment, and
FIG. 6 is a section on the line 6—6 of FIG. 5 on a larger scale.

In FIG. 1 a base plate 1 supports cross slides 2 and 3 respectively displaceable in guides 4 and 5, the guide 5 lying in front of the plane of the drawing. The slide 2 is displaceable by means of a spindle 8 rotated by an electric selsyn receiver 6. The slide 3 is displaceable by means of a spindle 9 rotated by an electric selsyn receiver 7. The spindle 8 on the base plate 1 is, like the guide 4, at right angles to the plane of the drawing. The spindle 9 on the slide 2 is, like the guide 5, parallel to the plane of the drawing. The selsyn receivers 6 and 7 are respectively connected by electric wires 10 and 11 with selsyn transmitters of a plotter (not shown).

The upper slide 3, which may carry a photogram (not shown), has an arm 12 the free end of which is a fork 13 rotatable about an axis X—X parallel to the plane of the drawing. The fork 13 holds a friction bearing 14 rotatable about an axis Y—Y. A feeler pin 16 influenced by a spiral spring 15 slides in the bearing 14 along its longitudinal axis (FIG. 2). To the bearing 14 is fixed a selsyn transmitter 25 the rotor of which is actuated by a wheel 26 rolling on the feeler pin 16. An electric wire 27 connects the selsyn transmitter 25 with a differential rectifier (not shown). The spring 15 urges the feeler pin 16 into contact with a plate 17, which serves as a stop and is rotatable about an axis Z—Z in a fork 18. The fork 18 is rotatable about an axis U—U on a journal 20 supported by a bracket 19 fast with the base plate 1. The journal 20 bears an index 21 which shows the rotations of the fork 18 about the axis U—U on a scale (not visible in the drawing) on the exterior surface 22 of the bracket 19. For measuring the rotations of the plate 19, this plate bears an index 23 working against a scale 24 on one of the prongs of the fork 18 (FIG. 3).

The known inclinations $\varphi$ and $\omega$ of the photograph at the time of exposure are adjusted by rotating the plate 17 about the axes U—U and Z—Z. The bearing 14 and the feeler pin 16 are thereby respectively rotated about the axes X—X and Y—Y into a position at right angles to the plate 17. The feeler pin 16 in its initial position contacts approximately the middle of the plate 17. If the slide 3 is displaced by the spindle 9, which by means of the selsyn receiver 7 and the electric wire 11 is kinematically connected with the x-spindle of the plotter (not shown), and/or if the slide 2 is displaced by the spindle 8, which by means of the selsyn receiver 6 and the electric wire 10 is kinematically connected with the y-spindle of the plotter, the feeler pin 16 is displaced relatively to the plate 17. If the plate 17 and the cross slide system 2, 3 are not parallel to each other, the pin 16 will slide in the bearing 14 and alter the length of the feeler system 14, 16. The displacement of the feeler pin 16 in its bearing 14 is transmitted by the wheel 26, the selsyn transmitter 25 and the electric wire 27 to a differential rectifier (not shown) for controlling the projection distance. The change in the length of the part of the feeler pin 16 which protrudes from the bearing 14 is equal to the change of the instantaneous camera constant.

Instead of the electric wires 10, 11 and the selsyn receivers 6, 7, it is of course possible to use mechanical means for the transmission of motion. The selsyn transmitter 25 can be replaced by a potentiometer.

FIG. 4 illustrates a photogrammetric camera (base) 28 which forms part of a plotter (not shown) and about whose projection center 29 pivots a cardanically suspended double lever 30. The camera 28 is provided with guides, of which only two, 31 and 32, are visible in the drawing. The guides 31 and 32 bear respectively sleeves 33 and 34 fast with a photogram carrier 35 adjustable for focusing along the guides. The photogram carrier 35 bears cross slides 36, 37 which are displaceable parallel to its surface supporting the photogram (image plane). The double lever 30 is cardanically linked to the slide 37. The slide 37 carries a prism 38 of a viewing system (not shown) and the one end of a cranked arm 39 which extends round about the photogram carrier 35 and with its other end holds an illumination system 40 and a feeler pin 42. The pin 42 slides in a bearing 41 and is cardanically linked to a slide 43 serving as a stop. Fast with the bearing 41 is a selsyn transmitter 44. The pivot (not visible in the drawing) of the transmitter 44 carries a wheel 45 which rolls on the feeler pin 42 and by an electric wire 46 is connected with a differential rectifier (not shown). The slide 43 is supported by a slide 49 which is mounted on guides 47 and 48 fast with the apparatus. The slide 49 is displaceable at right angles to the direction of motion of the slide 43.

In the embodiment shown in FIG. 4, the feeler system 41, 42 is not at right angles to the plane containing the slides 43 and 49. This is admissible if each of the inclinations $\varphi$ and $\omega$ of the photogram carrier 35 in two planes at right angles to each other is not greater than 5$g$, and is also admissible if not the full amounts of the instantaneous camera constant is measured, but only the differences of the instantaneous camera constant from the focal length corresponding to the principal point of the image, which is assumed to be zero. Instead of the selsyn transmitter 44, a potentiometer may be used.

The mode of operation of the apparatus shown in FIG. 4 is similar to that of the apparatus in FIGS. 1 to 3. Rotation of the double lever 30 is followed up by displacements of the slides 36 and 37 parallel to the image plane and, accordingly, by displacements of the cranked arm 39, the feeler system 41, 42 and the cross-slide system 43, 49. The feeler length protruding from the bearing 41 is a function of the rotation of the double lever 30. The motions of the feeler 42 are transmitted through the wheel 45, the selsyn transmitter 44 and the electric wire 46 to the differential platter.

In FIGS. 5 and 6, a base plate 62 having an aperture 61 supports two guides 50 and 51 of a slide 52 which in turn supports two guides 53 and 54 of a photogram carrier 55. The slide 52 has a slit 56 and, below the photogram carrier 55, a rectangular aperture 57 for viewing or illuminating a photogram (not shown). The lengths of the slit 56 and the aperture 57 depend on the range of motion of the photogram carrier 55. A cranked arm 58 is fast with the photogram carrier 55. A stop plate 60 fast with an axle 59 is rotatably mounted on the arm 58. The stop plate 60 and the axle 59 are rigidly interconnected by a flange 63 which has an index 64 engraved on its upper side. The index 64 works against a scale 65 on the arm 58 when the stop 60 is rotated. The end of the axle 59, which extends through the arm 58 and the aperture 56, is provided with a thread (not shown) engaged by a knourled nut 66. A stop plate 67 by means of a flange 68 and an axle 69 is rotatable on the slide 52, this rotation being measured by an index 70 engraved on the flange 68 and working against a scale 71 on the slide 52. Fast with the slide 52 is a potentiometer 72 which by means of a feeler 74 and a wheel 73 on this feeler contacts the stop plate 60. Fast with the base plate 62 is a potentiometer 75 which by means of a feeler 76 and a wheel 77 on this feeler contacts the stop plate 67. The feelers 74 and 76 and likewise the stop plates 60 and 67 are at right angles to each other when in their initial positions. The potentiometers 72 and 75 are respectively connected by electric wires 78 and 79 with a simple electric analog computer 80, which in its turn is connected by an electric wire 81 with a differential rectifier (not shown).

The embodment shown in FIGS. 5 and 6 operates as follows: The photogram carrier 55 is so adjusted that the wheels 73 and 77 respectively contact the stop plates 60 and 67 at points at right angles above the axles 59 and 69. Thereupon, the stop plate 60 is rotated in the direction corresponding to the inclination component $\varphi$, and the stop plate 67 is rotated in the direction corresponding to the inclination component $\omega$. The component $\varphi$ is adjusted with the aid of the index 64 and the scale 65, and the component $\omega$ with the aid of the index 70 and the scale 71. In the adjusted directions, illustrated in FIG. 1, the stop plate 60 is secured by tightening the nut 66, and the stop plate 67 by tightening another nut (not shown), whereupon the photogram carrier 55 can be displaced along its guides 53, 54 and the slide 52 along its guides 50, 51. These displacements are followed up by displacements of the feelers 74 and 76 according to the adjustments of the stop plates 60 and 67, so that the potentiometer pick-ups are subjected to motions, which produce corresponding electrical signals in the potentiometers 72 and 75. These signals are respectively transmitted through electric wires 78 and 79 to the analog computer 80, where the resistance values of the potentiometers 72 and 75 are summed up and through the electric wire 81 transmitted to the differential rectifier (not shown).

Alternatively, the stop plate 60 may be attached to the slide 52 instead of to the photogram carrier 55, and the stop plate 67 may be attached to the base plate 62 instead of to the slide 52 and, accordingly, the feeler 74 to the photogram carrier 55 and the feeler 76 to the slide 52.

If the feeler is fast with a slide of a plotter, the slide carrier is to be considered as the base of the ancillary device. If the feeler body is a plotter, one of the slide carriers of this plotter is to be considered as the base of the ancillary device.

We claim:

1. An ancillary device for the determination of the instantaneous camera constant of obliquely taken photographs to be rectified differentially, which can be coupled to a photogrammetric plotter on the one hand and to a differential rectifier on the other, and which comprises:

a base, at least one stop plate, at least one feeler body, said stop plate and said feeler body being adjustably mounted on said base and displaceable relatively to each other in planes which include an angle corresponding to the angle of inclination of the photograph at the moment of exposure, said stop plate being rotatable about at least one axis, said feeler body being of variable length and in constant contact with said stop plate and substantially at right angles to said stop plate, means for the relative motions of said stop plate and said feeler body, and means for transmitting the length variations of said feeler body to the differential rectifier.

2. A device as claimed in claim 1, wherein the feeler body is universally rotatable.

3. A device as claimed in claim 1, wherein the feeler body is connected with a photogram carrier of the plotter.

4. A device as claimed in claim 1, wherein the free end of the feeler body carriers a roller.

References Cited

UNITED STATES PATENTS 3,054,854  9/1962  Neasham _____ 355—52

NORTON ANSHER, Primary Examiner

R. A. WINTERCORN, Assistant Examiner

U.S. Cl. X.R.

95—12.5